(12) United States Patent
Howard (10) Patent No.: US 11,252,862 B1
(45) Date of Patent: Feb. 22, 2022

(54) TURFGRASS BRUSHING ASSEMBLY AND SYSTEM

(71) Applicant: Harold F. Howard, Phoenix, AZ (US)

(72) Inventor: Harold F. Howard, Phoenix, AZ (US)

( * ) Notice: Subject to any disclaimer, the term of this patent is extended or adjusted under 35 U.S.C. 154(b) by 0 days.

(21) Appl. No.: 16/448,378

(22) Filed: Jun. 21, 2019

Related U.S. Application Data (63) Continuation-in-part of application No. 14/880,941, filed on Oct. 12, 2015, now Pat. No. 10,368,483.

(60) Provisional application No. 62/063,687, filed on Oct. 14, 2014.

(51) Int. Cl.
| | | |
|---|---|---|
| *A01D 34/00* | (2006.01) | |
| *A01D 34/835* | (2006.01) | |
| *A01D 34/82* | (2006.01) | |
| *A01G 20/40* | (2018.01) | |

(52) U.S. Cl.
CPC ........... *A01D 34/001* (2013.01); *A01D 34/82* (2013.01); *A01D 34/835* (2013.01); *A01G 20/40* (2018.02)

(58) Field of Classification Search
CPC ...... A01D 34/001; A01D 34/42; A01D 34/62; A01D 34/63; A01D 34/82; A01D 34/835; A01D 34/8355; A01D 57/01; A01D 2101/00; A01D 43/06; A01D 43/10; A01D 43/102; A01D 82/00; A01G 20/00; A01G 20/43; A01G 20/47; A01B 45/00; A01B 45/02; E01H 1/02
See application file for complete search history.

(56) References Cited

U.S. PATENT DOCUMENTS

| | | | |
|---|---|---|---|
| 1,168,713 A | 1/1916 | Cummins | |
| 1,566,194 A | 12/1925 | Freeman | |
| 1,674,306 A | 6/1928 | Shaw | |
| 1,757,844 A | 5/1930 | Baptiste | |
| 2,143,402 A * | 1/1939 | Baker | A01D 57/01 |
| | | | 56/249 |
| 2,157,620 A * | 5/1939 | McGrath | A01D 34/001 |
| | | | 56/249 |
| 2,268,250 A | 12/1941 | Gormley | |
| 2,300,192 A | 10/1942 | James | |
| 2,483,846 A * | 10/1949 | Roche | A01B 45/02 |
| | | | 56/249 |

(Continued)

FOREIGN PATENT DOCUMENTS

GB 106105 A 5/1917

*Primary Examiner* — Thomas B Will
*Assistant Examiner* — Joan D Misa
(74) *Attorney, Agent, or Firm* — Booth Udall Fuller, PLC (57) ABSTRACT

A turfgrass brushing assembly and system is disclosed. A frame assembly may be configured to removably couple to a mower cutting unit, and may have a cross member and two opposing side plates. Each side plate may include an array of holes and a pivot coupling configured to pivotally couple the turfgrass brushing assembly to the mower cutting unit. Each side plate may be releasably coupled to a different end of the cross member through at least one hole of the array of holes. A brush holder assembly may be adjustably coupled to the frame assembly, and may have a brush block coupling configured to couple to a brush. An angle adjustment assembly may be coupled to the brush holder assembly and the cross member. The angle adjustment assembly may pivot to adjust a relative angle of the brush holder assembly with respect to the frame assembly.

7 Claims, 11 Drawing Sheets

(56) References Cited

U.S. PATENT DOCUMENTS

| | | | |
|---|---|---|---|
| 2,660,018 A * | 11/1953 | Clemson | A01D 34/46 56/249 |
| 2,962,946 A | 12/1960 | Neff | |
| 2,973,535 A | 3/1961 | Olay | |
| 3,525,201 A | 8/1970 | Kaufman | |
| 3,555,793 A * | 1/1971 | Chapman | A01D 34/828 56/17.4 |
| 3,765,159 A * | 10/1973 | Neff | A01B 45/00 56/396 |
| 4,747,174 A | 5/1988 | Hightower | |
| 4,899,828 A * | 2/1990 | Harris | A01B 45/02 172/21 |
| 4,989,676 A | 2/1991 | Rogers | |
| 5,182,830 A | 2/1993 | Viola | |
| 5,477,927 A | 12/1995 | Figura | |
| 5,833,013 A | 11/1998 | Davis | |
| 6,088,865 A | 7/2000 | Truan | |
| 6,655,469 B1 | 12/2003 | Davis | |
| D514,597 S | 2/2006 | Lynch | |
| 7,065,947 B1 | 6/2006 | Street | |
| 7,069,711 B1 | 7/2006 | Connell | |
| 7,631,477 B2 * | 12/2009 | Eavenson, Sr. | A01D 43/00 56/1 |
| 8,220,240 B2 | 7/2012 | Tielburger | |
| 9,371,617 B2 | 6/2016 | Thunstrom | |
| 9,839,176 B1 | 12/2017 | Snyder | |
| 10,375,886 B2 * | 8/2019 | Hine | A01D 34/47 |
| 2003/0230067 A1 | 12/2003 | Weinlader | |
| 2006/0123760 A1 | 6/2006 | Glasscock | |
| 2012/0096661 A1 | 4/2012 | Pizano | |
| 2014/0262386 A1 | 9/2014 | Davis | |
| 2015/0096278 A1 * | 4/2015 | Sprinkmann | A01D 34/001 56/17.4 |
| 2015/0201554 A1 | 7/2015 | McCarthy | |

* cited by examiner

TURFGRASS BRUSHING ASSEMBLY AND SYSTEM

RELATED APPLICATIONS

This application is a continuation-in-part of, and claims the benefit of, U.S. patent application Ser. No. 14/880,941, filed Oct. 12, 2015, titled "TURFGRASS BRUSHING ASSEMBLY AND SYSTEM" which claims the benefit of U.S. provisional patent application 62/063,687, filed Oct. 14, 2014 titled "LAWN BRUSHING SYSTEM." The entirety of the above referenced disclosures are hereby incorporated herein by this reference.

TECHNICAL FIELD

Aspects of this document relate generally to turfgrass brushing systems.

BACKGROUND

The efficiency of turfgrass mower cutting units is often reduced by debris and positioning of the grass blades. Turfgrass plants have a genetic tendency to orient their leaf blades diagonally or even horizontally. When a turfgrass mower cutting unit passes over the bent grass, the turfgrass mower cutting unit may not cut the turfgrass because the turfgrass is bent over.

SUMMARY

According to one aspect, a turfgrass brushing assembly is disclosed that includes a frame assembly configured to removably couple to a mower cutting unit. The frame assembly includes a cross member and two opposing side plates, each side plate including an array of holes and a pivot coupling configured to pivotally couple the turfgrass brushing assembly to the mower cutting unit. Each side plate is releasably coupled to a different end of the cross member through at least one hole of the array of holes to allow a user to adjust the position of the cross member with respect to the two opposing side plates. A brush holder assembly may be adjustably coupled to the frame assembly, the brush holder assembly including a brush block coupling configured to couple to a brush. An angle adjustment assembly may be coupled to the brush holder assembly and the cross member of the frame assembly. The angle adjustment assembly pivots to adjust a relative angle of the brush holder assembly with respect to the frame assembly.

Particular implementations may include one or more or all of the following.

Each end of the cross member may include a mounting plate, and the cross member may be removably coupled to the two opposing side plates through the mounting plates.

The frame assembly may further include two fixed couplings that couple the frame assembly to the mower cutting unit and prevent the turfgrass brushing assembly from pivoting about the pivot couplings of the frame assembly with respect to the mower cutting unit. The pivot coupling of each side plate may be a bushing extending outward from the frame assembly. Each fixed coupling of the frame assembly may be a bolt. Alternatively, the pivot coupling of each side plate may be an aperture sized to receive a portion of the mower cutting unit. Each of the two fixed couplings of the frame assembly may be a yoke having a concave end sized to receive a portion of the mower cutting unit. A fastener may be releasably coupled to the concave end of one of the two yokes, closing the concave end and trapping the portion of the mower cutting unit.

A brush may be removably coupled to the brush block coupling. The brush holder assembly may further include one or more swivel blocks coupled to the brush block coupling and pivotally coupled to the frame assembly. The one or more swivel blocks may include two swivel blocks each pivotally coupled to a different vertical adjuster of two vertical adjusters. Each of the two vertical adjusters may be removably coupled to the cross member of the frame assembly with a coupling extending through one of a plurality of holes positioned to allow a user to vertically adjust a height of the vertical adjuster and the brush holder assembly by extending the coupling through one of the plurality of holes.

According to another aspect, a turfgrass brushing assembly may include a frame assembly configured to removably couple to a mower cutting unit. The frame assembly may include two opposing side plates, each coupled to a different end of a cross member. Each side plate may include a pivot coupling configured to pivotally couple the turfgrass brushing assembly to the mower cutting unit. A brush holder assembly may be adjustably coupled to the frame assembly, the brush holder assembly including a brush block coupling configured to couple to a brush. An angle adjustment assembly may be coupled to the brush holder assembly and the cross member of the frame assembly. The angle adjustment assembly pivots to adjust a relative angle of the brush holder assembly with respect to the frame assembly.

Particular implementations may include one or more or all of the following.

Each of the two opposing side plates further may include an array of holes. The cross member may be removably coupled to each side plate through at least one hole of the array of holes to allow a user to adjust the position of the cross member with respect to the two opposing side plates.

Each end of the cross member may include a mounting plate. The cross member may be removably coupled to the two opposing side plates through the mounting plates.

The frame assembly further may include at least one fixed coupling that couples the frame assembly to the mower cutting unit and prevents the turfgrass brushing assembly from pivoting about the pivot couplings of the frame assembly with respect to the mower cutting unit.

The at least one fixed coupling of the frame assembly may be at least one bolt.

The at least one fixed coupling of the frame assembly may be at least one yoke having a concave end sized to receive a portion of the mower cutting unit. The at least one yoke may be two yokes. Additionally, a fastener may be releasably coupled to the concave end of one of the at least one yoke, closing the concave end and trapping the portion of the mower cutting unit. Also, all of the at least one yoke may extend outward from the frame assembly in the same direction.

The pivot coupling of each side plate may be an aperture sized to receive a portion of the mower cutting unit.

The pivot coupling of each side plate may be a bushing extending outward from the frame assembly.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

This disclosure, its aspects and implementations, are not limited to the specific components or assembly procedures disclosed herein. Many additional components and assembly procedures known in the art consistent with the intended turfgrass brushing device and/or assembly procedures for a turfgrass brushing assembly will become apparent for use with implementations of turfgrass brushing assembly from this disclosure. Accordingly, for example, although particular assemblies are disclosed, such assemblies and implementing components may comprise any shape, size, style, type, model, version, measurement, concentration, material, quantity, and/or the like as is known in the art for such turfgrass brushing assembly and implementing components, consistent with the intended operation of a turfgrass brushing assembly.

Turfgrass plants have a genetic tendency to orient their leaf blades diagonally or even horizontally. Hence, the leaf blades may be very much longer than the cutting height setting on the cutting units. As an athletic surface, the turf performance would be dramatically improved if the leaf blades are stood up vertically as the cutting units pass by. The resulting leaf blades are much shorter and substantially vertical. Various embodiments contemplated in this disclosure are configured to stand the long leaves of turfgrass up vertically a fraction of a second before the turfgrass is clipped by the cutting unit. During the fraction of a second, the leaf blades do not have time to revert back to the generally horizontal or sloped orientation. Contemplated in this disclosure are one or more turfgrass brushing assemblies configured to couple to an individual turfgrass cutting or mowing unit and/or supporting framework thereof. Embodiments of a turfgrass brushing assembly according to this disclosure are configured to brush turf immediately in advance of the cutting of turfgrass by the individual cutting unit. A large mower may have multiple cutting units attached to one traction machine. Hence, such a multiple-cutting-unit machine may have multiple turfgrass brushing assemblies coupled thereto, one for each cutting unit. In one or more embodiments, a turfgrass brushing assembly brushes turfgrass immediately in advance of the turfgrass's cutting. In doing so, horizontal turfgrass leaves are brushed into a vertical orientation so that the cutting unit is able to cut them cleanly before the leaves have an opportunity to relax back to a horizontal orientation. The result is a turfgrass stand consisting of short leaves with a vertical orientation.

Figure 1:
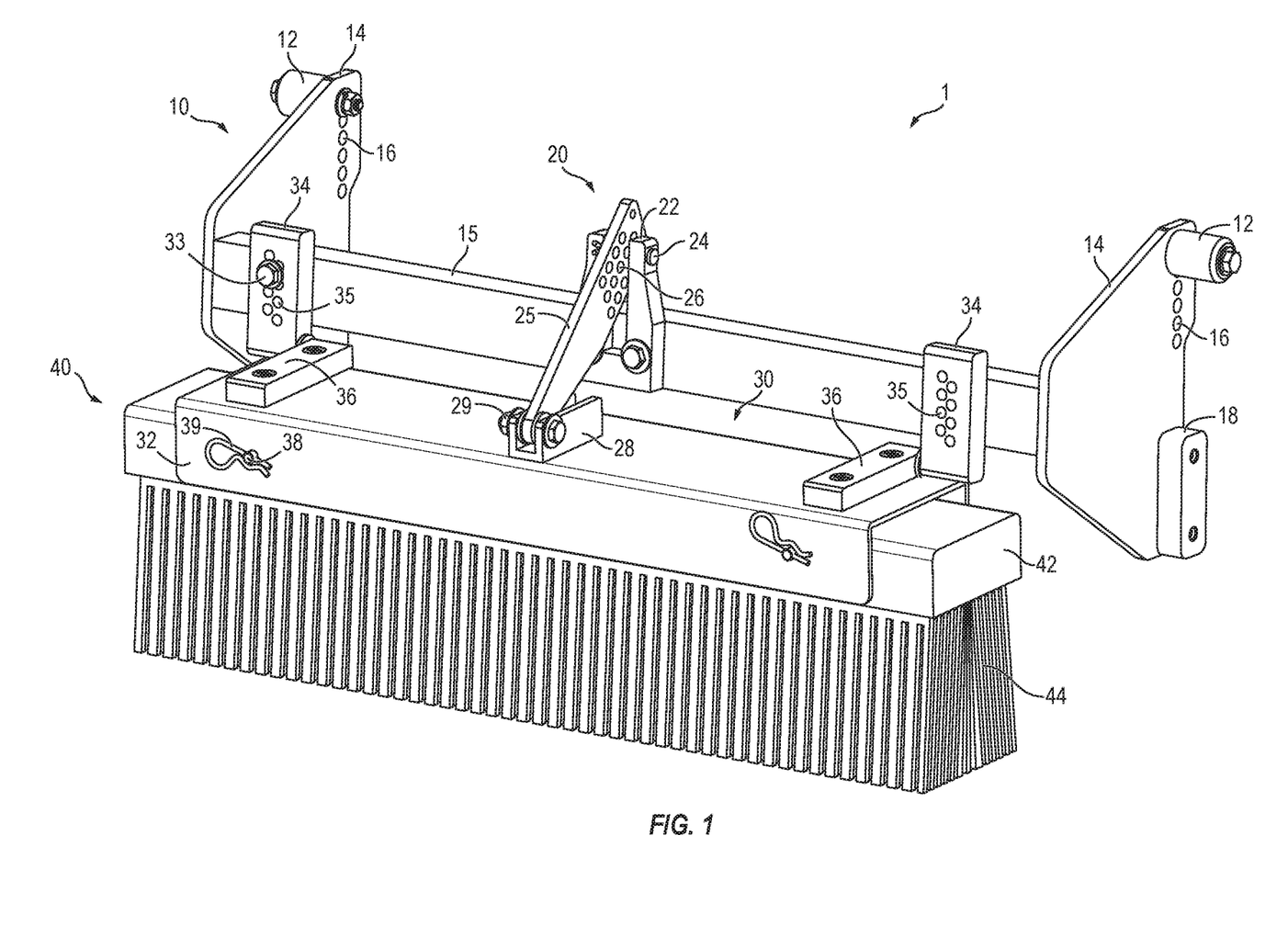
FIG. 1 is perspective view of a first embodiment of a turfgrass brushing assembly.
Figure 2:
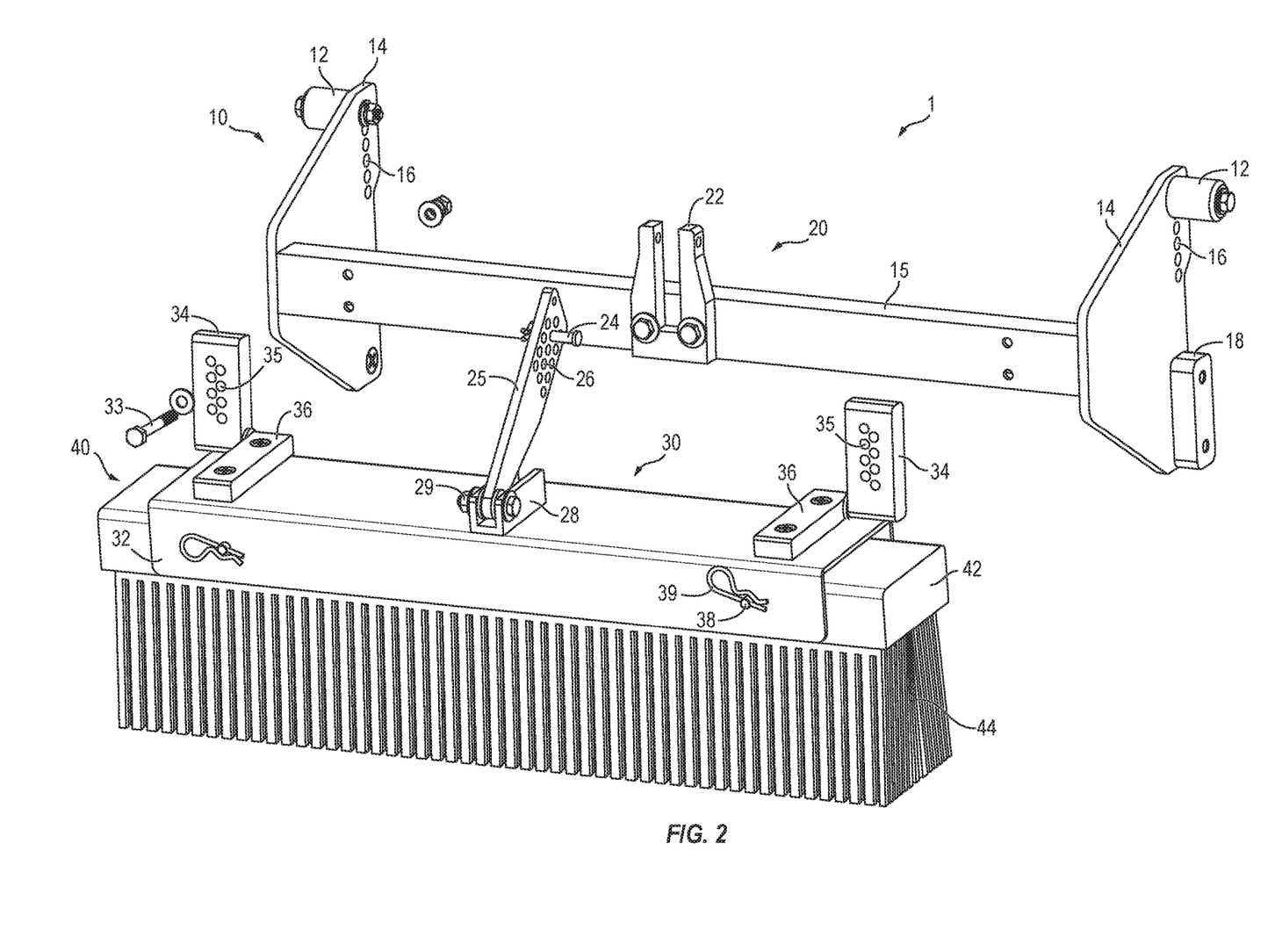
FIG. 2 is an exploded view of a first embodiment of a turfgrass brushing assembly.
Figure 6:
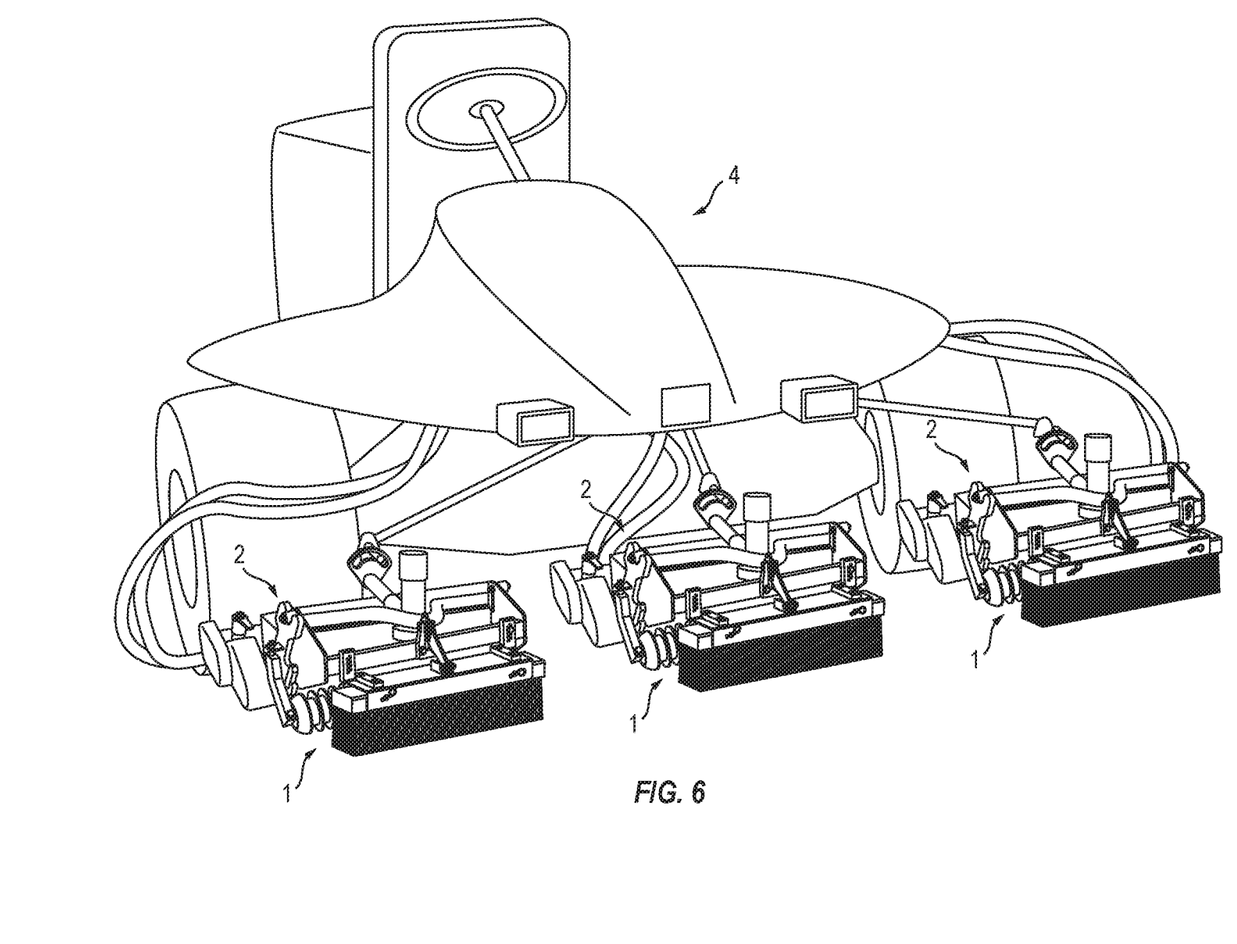
FIG. 6 is a perspective view of a plurality of first embodiments of a turfgrass brushing assembly coupled to a plurality of turfgrass mower cutting units being pushed by a turfgrass tractor.

According to some aspects, a turfgrass brushing assembly 1 comprises a frame assembly 10 and a brush holder assembly 30. FIG. 1 depicts a non-limiting embodiment of a turfgrass brushing assembly 1, and FIG. 2 depicts an exploded view of the non-limiting embodiment of FIG. 1. According to some aspects, a frame assembly 10 is configured to removably couple to a mower cutting unit 2 (shown in FIGS. 3 and 6) and the brush 40 is removably and pivotally coupled to the frame assembly 10. In more particular embodiments, the brush 40 may be removably coupled to a brush holder assembly 30 and the brush holder assembly 30 is pivotally coupled to the frame assembly 10.

In one or more embodiments, a frame assembly 10 of a turfgrass brushing assembly 1 comprises a cross member 15 and two opposing side plates 14 each coupled to a different end of the cross member. The side plates 14 are configured to removably couple to a mower cutting unit 2 with a pivot coupling 12, and the cross member 15 is configured to removably couple to one or more vertical adjustors 34. According to some aspects, a cross member 15 and side plates 14 are welded to form one solid component. In other embodiments, the cross member 15 may be removably coupled to the side plates 14.

In some embodiments, the side plates 14 are configured to removably couple to a mower cutting unit 2. According to some aspects, the side plates 14 are configured to pivotally couple to the mower cutting unit 2 or associated framework. More particularly, each side plate may comprise a plurality of holes 16 through which a pivot coupling 12 extends to pivotally couple the frame assembly to a mower cutting unit 2. According to some aspects, the pivot couplings 12 comprise solid cylindrical pivot couplings 12 bolted or otherwise coupled to the side plates 14 of the frame assembly 10. More particularly, the pivot couplings 12 may comprise a cylindrical pivot coupling comprising either metal or polyoxymethylene. The turfgrass brushing assembly 1 may be mounted to a mower cutting unit 2 by inserting the pivot couplings 15 into either existing yokes 3 (shown in FIG. 3) or mounts in the mower cutting unit 2 or its associated frame work. In other embodiments, a turfgrass brushing assembly 1 may pivotally couple to tubes comprising opposing open ends on the mower cutting unit 2. When pivotally mounted to a yoke 3, tubes, or mounts on a mower cutting unit, a turfgrass brushing assembly 1 is then able to pivot relative to the mower cutting unit 2 by pivoting about the pivot couplings 12. A turfgrass brushing assembly 1 may be adjusted vertically relative to the mower cutting units 2 by selecting among the available holes 16 in the side plates 14. In one or more embodiments, a turfgrass brushing assembly may further comprise a locking element. The comprises a hole sized to receive the pivot coupling 52 and may be coupled to either the frame assembly 10 or the turfgrass mower cutting unit 2 to prevent the pivot coupling from removing from the yoke 3.

In one or more embodiments, each side plate 14 comprises one or more bumpers 18 or contact points. These bumpers 18 or contact points are positioned on the side plates 14 to interface a portion of the mower cutting unit 2 and hold the frame assembly 10 in a stable position while the mower cutting unit 2 pushes the frame assembly 10 and brush 40 forward as the mower cutting unit 2 is moving. Thus, the mower cutting unit 2 is able to float largely independent of the turfgrass brushing assembly 1 while it is pushing the frame assembly 10 and brush 40 forward. When the mower cutting units 2 are retracted for transport, the turfgrass brushing assembly 1 also retracts along with the mower cutting units 2. According to some aspects, the bumpers 18 comprise polyoxymethylene material.

One or more vertical adjustors 34 may be removably coupled to the cross member 15 with bolts 33, screws, pins, or any other coupling known in the art. According to some aspects, each vertical adjustor 34 comprises plurality of holes 35 extending through each vertical adjustor 34. The plurality of holes 35 on the vertical adjustor 34 allow a user to adjust the height of the brush 40 relative to the frame assembly 10, thus vertically adjusting the height of the brush 40 coupled to the turfgrass brushing assembly 1. For example, a user may select a predetermined hole of the plurality of holes 35 on the vertical adjustor 34 to extend the bolt 33 or other coupling through the vertical adjustor 34 to couple the vertical adjustor 34 to the cross member 15. In some embodiments, the bolt 33 also extends through a hole on the cross member 15. It is also contemplated that two or more bolts 33 or other couplings may be used to couple each vertical adjustor 34 to the cross member 15, as depicted in the non-limiting embodiment of FIGS. 1 and 2.

As noted above, embodiments of a turfgrass brushing assembly 1 may comprise a brush holder assembly 30 pivotally coupled to the frame assembly 10. According to some aspects, a brush holder assembly 30 comprises a brush block coupling 32 and one or more swivel blocks 36 coupled to the brush block coupling 32. The brush block coupling 32 is configured to removably couple to a brush block 42 of the brush 40. More particularly, the brush block coupling 32 may comprise a channel or U-shaped bracket such as but not limited to an aluminum channel. The channel is sized to position a block 42 of the brush 40 within the channel. According to some aspects, one or more brush holding pins 38 couple the brush block 42 to the channel. For example, one or more brush holding pins 38 may be inserted through holes in the channel, passed through holes in the block 42 of the brush 40, and retained in place with retention clips 39. In other embodiments, the block 42 of the brush 40 may be coupled to the channel or the brush block coupling 32 with other couplings known in the art, such as but not limited to screws, bolts, and the like. These various configurations allow for easy removal and replacement of the brush 40.

In some embodiments, one or more swivel blocks 36 coupled to the brush block coupling 32 pivotally couple the brush holder assembly 30 to the frame assembly 10. More particularly, the one or more swivel blocks 36 may comprise two swivel blocks 36 each pivotally coupled to a different vertical adjuster 34 of the frame assembly 10. Even more particularly, each swivel block 36 may be pivotally coupled to the vertical adjustor 35 with a dowel pin inserted into a hole in the respective vertical adjustor 34 and respective swivel block 36. Such a configuration allows the brush holder assembly 30 to swivel or pivot relative to the frame assembly 10 via rotation about the dowel pins.

One or more embodiments of a turfgrass brushing assembly 1 comprise an angle adjustment assembly 20. The angle adjustment assembly 20 is configured to adjust a relative angle of the brush 40 of the turfgrass brushing assembly land may be coupled to the brush holder assembly 30 and the frame assembly 10. According to some aspects, the angle adjustment assembly 20 comprises a pivot channel 28 coupled to the brush block coupling 32 of the brush holder assembly 30, a linkage arm 25 pivotally coupled to the pivot channel 28 at a first end of the linkage arm 25, and a fork 22 coupled to the cross member 15 or other portions of the frame assembly 10 and pivotally coupled to the linkage arm 25. In some embodiments, the linkage arm 25 is removably coupled to the fork 22 with a pin 24 that extends through a portion of the fork 22 and through one of a plurality of holes 26 on the linkage arm 25. With such coupling, the relative angle of the brush 40 may be adjusted responsive to extending the pin 24 through different holes 26 of the plurality of holes 26 on the linkage arm 25. The linkage arm 25 may be coupled to the pivot channel 28 via a loose-fitting bolt 29 or any other coupling known in the art such that the linkage arm 25 is able to swivel relative to the brush holder assembly 30. For example, once a desired angle position of the brush holder assembly 30 relative to the frame assembly 10 is selected, the two assemblies may be held in that relative position by inserting a pin 24 through a hole in the top of the fork 22 and through a selected hole 26 in the linkage arm 25.

In one or more embodiments, the turfgrass brushing assembly 1 comprises a brush 40 comprising a brush block 42 and bristles 44. The brush block may comprise either solid wood or plastic. According to some aspects, the brush assembly 40 may be adapted specifically to the brushing needs of the turfgrass by varying the mounting pattern of the bristles 44 in the block 42, the length of the bristles 44, the shape of the bristles 42, and the material composition of the bristles 44. Furthermore, a wide array of brush styles may be utilized in different embodiments of a turfgrass brushing assembly. The operator or user is thus able to select the proper aggressiveness of a brush to match the prevailing management needs of the turfgrass. In addition to mere brushing, in some embodiments the bristles 44 are configured to scratch the turfgrass surface and remove plant material.

Figure 3:
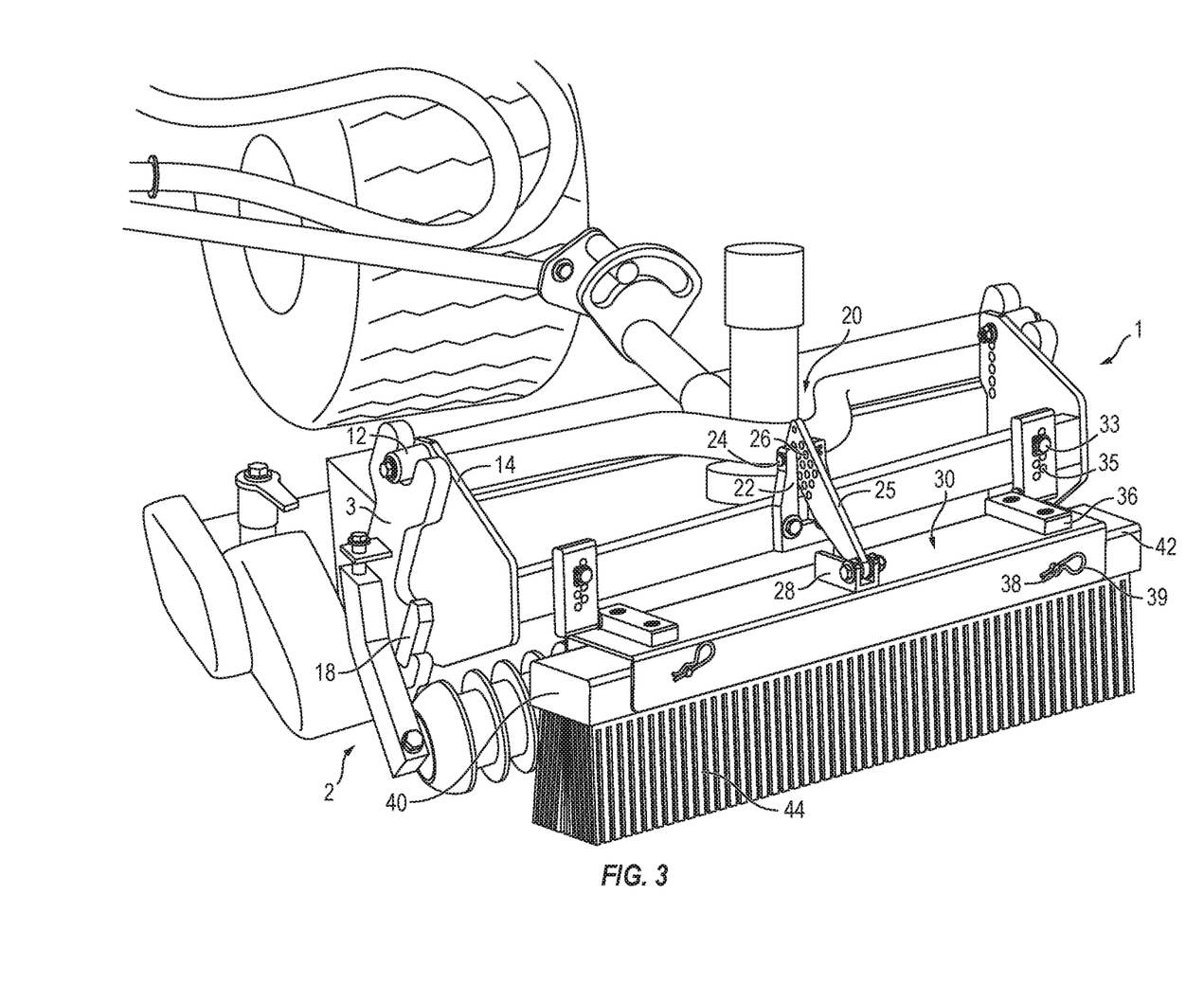
FIG. 3 is a perspective view of a first embodiment of a turfgrass brushing assembly to a turfgrass mower cutting unit.

As previously referenced in this document, a turfgrass brushing assembly 1 may be pivotally mounted or otherwise coupled to a turfgrass mower cutting unit 2. For example, FIG. 3 depicts a non-limiting embodiment of a turfgrass brushing assembly 1 mounted in front of a turfgrass mower cutting unit 2 such that the brush 40 precedes the turfgrass mower cutting unit 2 in contact the turfgrass during use. According to some aspects, pivot couplings 12 may be mounted to yokes 12 that are standard in some turfgrass mower cutting units 2. In other embodiments, pivot coupling 12 may be mounted in custom yokes made especially for the turfgrass brushing assembly or pivotally coupled within comprising opposing open ends on the mower cutting unit 2. When pivotally mounted to a yoke 3, tubes, or mounts on a mower cutting unit, a turfgrass brushing assembly 1 is then able to pivot relative to the mower cutting unit 2 by pivoting about the pivot couplings 12. A turfgrass brushing assembly 1 may be adjusted vertically relative to the mower cutting units 2 by selecting among the available holes 16 in the side plates 14. In some embodiments, a tractor 4 or other device may push a plurality of turfgrass brushing assemblies 1 pivotally coupled to a plurality of turfgrass mower cutting units 2. For example, in the non-limiting embodiment shown in FIG. 6, a tractor 4 is depicted pushing three brushing assemblies 1, each brushing assembly 1 pivotally coupled to a different turfgrass mower cutting unit 2. This configuration allows for more efficient and customized turfgrass brushing to meet the needs of the operator.

Figure 4:
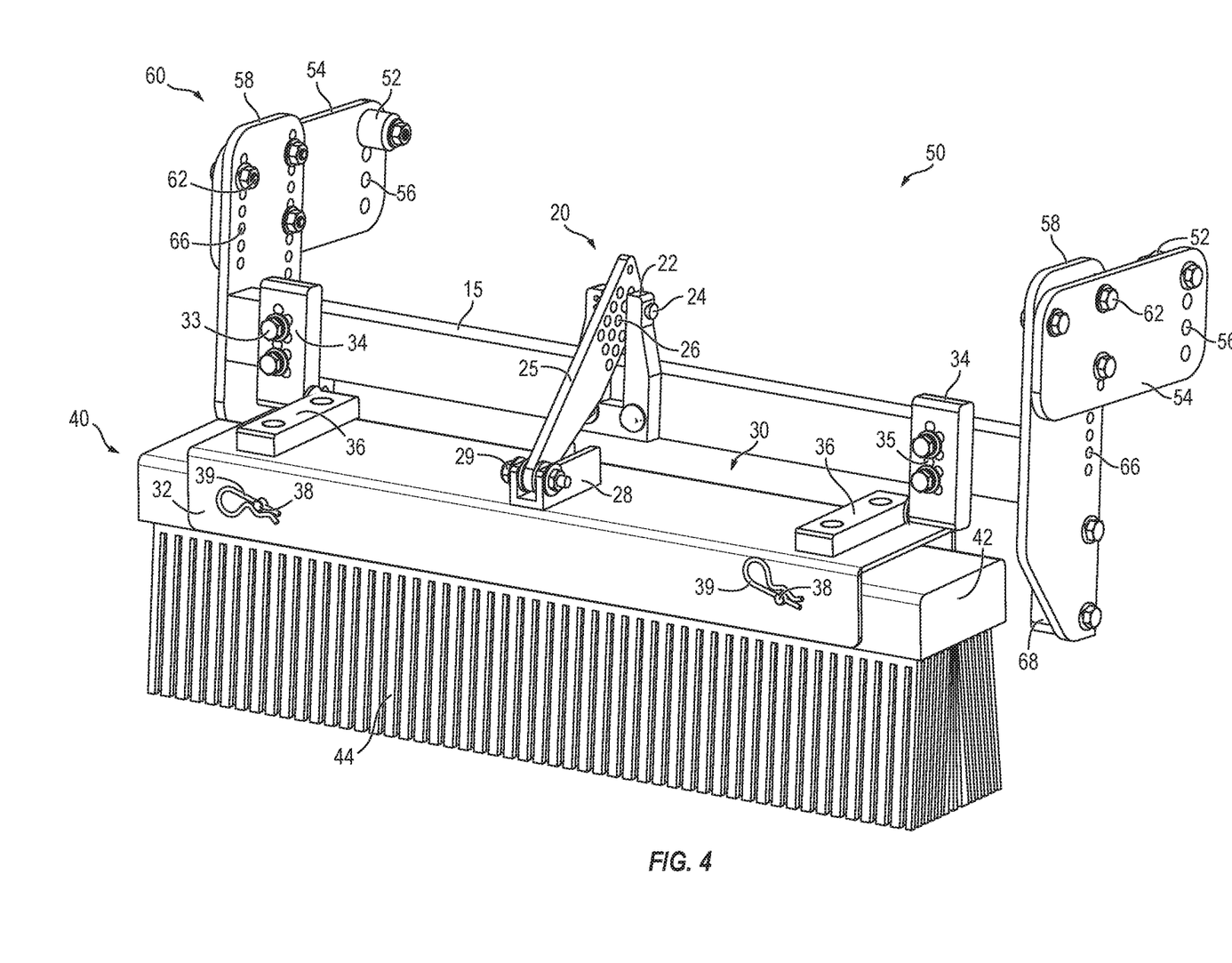
FIG. 4 is a perspective view of a second embodiment of a turfgrass brushing assembly.
Figure 5:
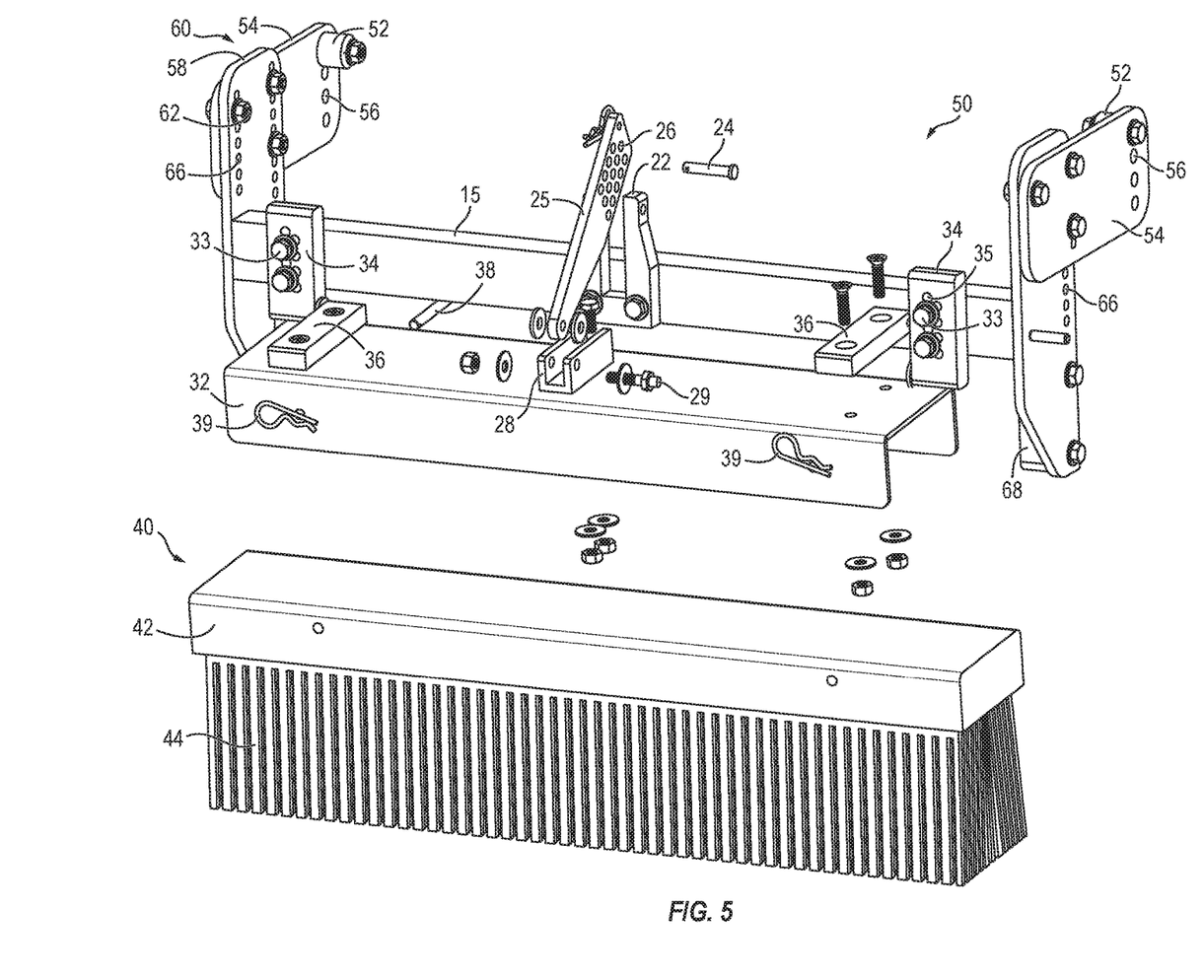
FIG. 5 is an exploded view of a second embodiment of a turfgrass brushing assembly.

FIGS. 4 and 5 depict another non-limiting embodiment of a turfgrass brushing assembly 50. Unless otherwise specified, a turfgrass brushing assembly 50 comprises parts, elements, and descriptions provided above in relation to turfgrass brushing assembly 1. For example, a turfgrass brushing assembly 50 may comprise a brushing assembly 30, an angle adjustment assembly 20, vertical adjusters 34, and the like similar to those described in relation to the turfgrass brushing assembly 1. Furthermore, it is contemplated that aspects of a turfgrass brushing assembly shown in relation to the turfgrass brushing assembly 1 may be applied to a turfgrass brushing assembly 50, and vice versa, without departing from the scope of this disclosure.

In one or more embodiments, a frame assembly 60 of a turfgrass brushing assembly 50 comprises a cross member 15, two opposing first side plates 54, and two opposing second side plates 58. According to some aspects, the two opposing second side plates 58 are coupled to the cross member 15 distal one another. The second side plates 58 may be welded, fixedly coupled, or removably coupled with any suitable coupling known in the art. According to some aspects, the second side plates 58 are height adjustable coupled to the cross member 15. Each second side plate 58 may further comprise a bumper 68 or contact point coupled to the second side plate 58. In some embodiments, the bumper 68 is removably coupled to second side plate 58 below the cross member 15, and may be removably coupled to the second side plate 58 and positioned on either an inward facing surface or an outward facing surface of the second side plate 58. In the non-limiting embodiment shown in FIGS. 4 and 5, the bumper 68 is removably coupled to an inward facing surface of a second side plate 58. The bumper 68 is positionable as a contact point with parts of the turfgrass mower cutting unit 2 to prevent the turfgrass brushing assembly 50 from pivoting too far towards the turfgrass more cutting unit 2. Each second side plate 58 may further comprise a plurality of holes 66 positioned receive one or more couplings 62 for adjustable and removable coupling of the first side plate 54 to the second side plate 58. In some embodiments, the holes 66 extend through the second side plate 58 and are distal the bumper 68.

A frame assembly 60 of a turfgrass brushing assembly 50 may further comprise two first side plates 54 each removably and adjustably coupled a different second side plate 58. For example, in the non-limiting embodiment shown in FIGS. 4 and 5, each first side plate 54 is removably and height adjustably coupled to a different second side plate 58 with bolts 62. Each first side plate 54 may comprise one or more holes positioned to align with one or more holes 66 of the second side plate 58 for coupling of the first side plate 54 and the second side plate 58 together. In other embodiments, each first side plate 54 is fixedly coupled a different second side plate 58.

Each first side plate 54 of a frame assembly 60 may further comprise one or more holes 56 distal the second side plate 58 configured to allow removable coupling of a pivot coupling 52 to the first side plate 54. In the non-limiting embodiment shown in FIGS. 5 and 6, each first side plate 54 comprises a plurality of holes 56 positioned for removable and height adjustable coupling of the pivot coupling 52 to the first side plate 54. The pivot coupling 52 may comprise any of the materials, shapes, and configurations of pivot couplings 52 described elsewhere in this document, and may be moveable to couple to either an inward facing surface of the first side plate 54 (shown in FIGS. 4 and 5) or an outward facing surface of the first side plate 54.

Figure 7:
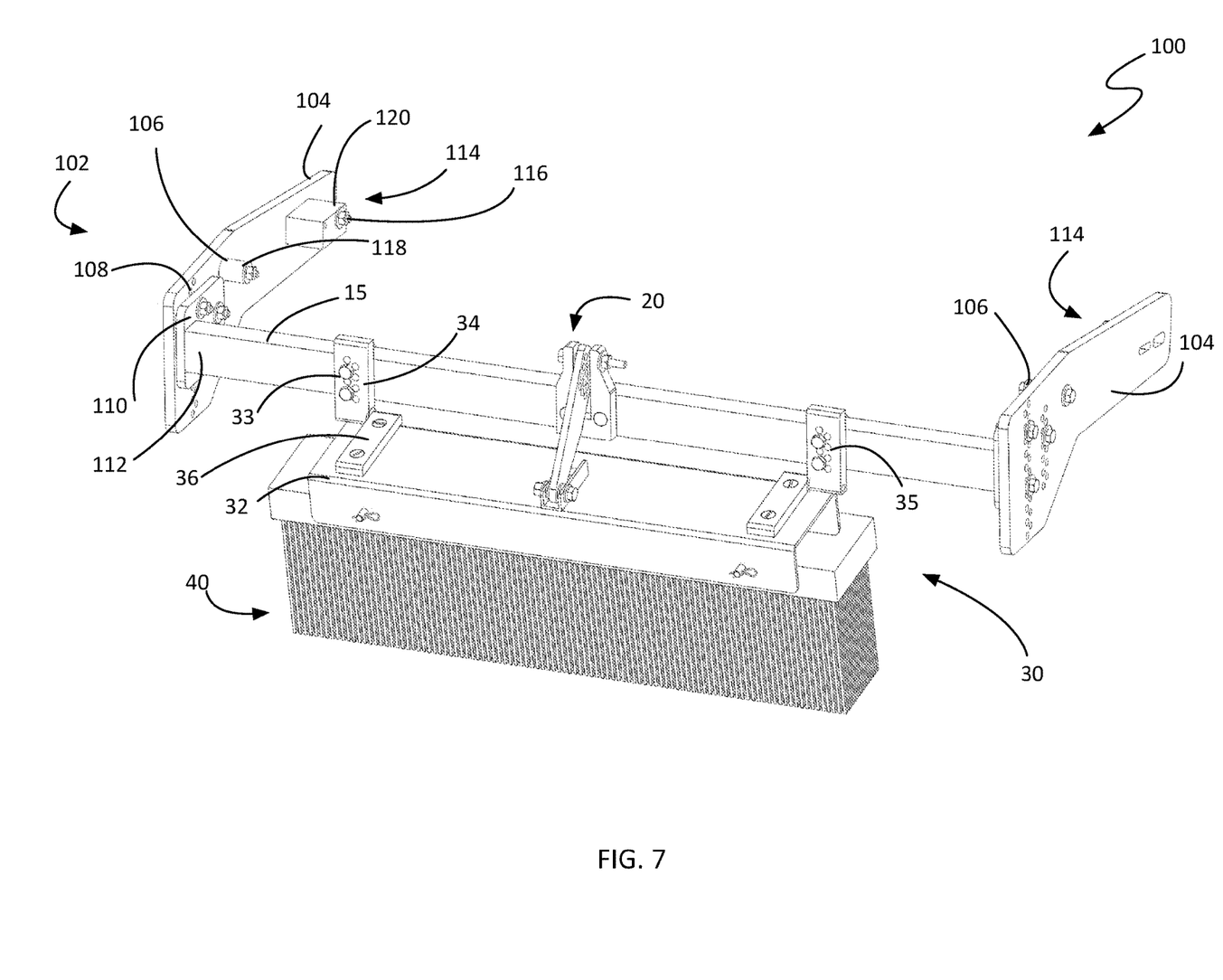
FIG. 7 is a perspective view of a third embodiment of a turfgrass brushing assembly.
Figure 8:
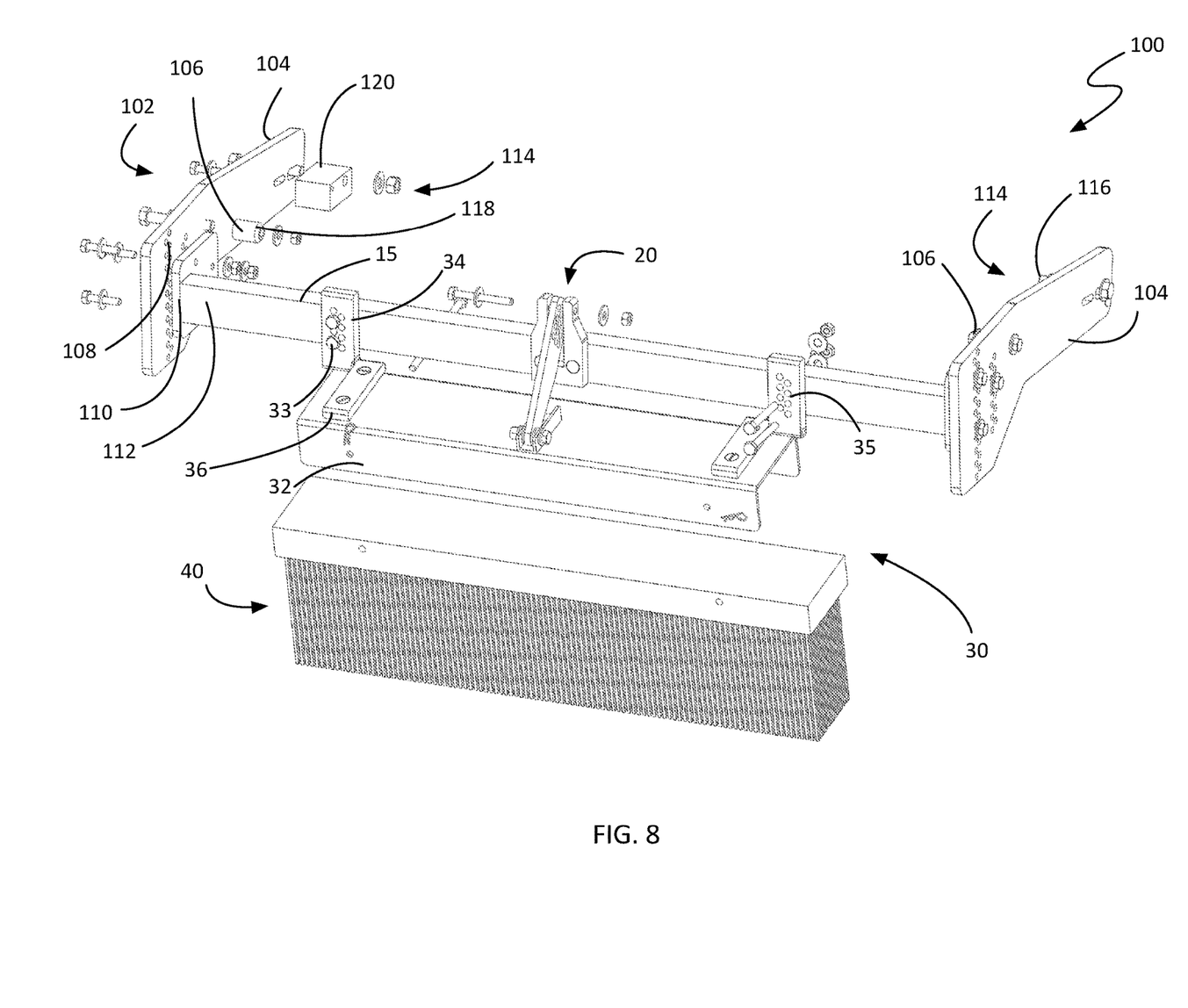
FIG. 8 is an exploded view of a third embodiment of a turfgrass brushing assembly.

FIGS. 7 and 8 depict yet another non-limiting embodiment of a turfgrass brushing assembly 100. Unless otherwise specified, a turfgrass brushing assembly 100 comprises parts, elements, and descriptions provided above in relation to turfgrass brushing assemblies 1 and 50. For example, a turfgrass brushing assembly 100 may comprise a brushing assembly 30, an angle adjustment assembly 120, and the like similar to those described in relation to the turfgrass brushing assemblies 1 and 50. Furthermore, it is contemplated that aspects of a turfgrass brushing assembly shown in relation to the turfgrass brushing assembly 1 may be applied to a turfgrass brushing assembly 100, and vice versa, without departing from the scope of this disclosure.

In one or more embodiments, a frame assembly 102 of a turfgrass brushing assembly 100 comprises a cross member 15 and two opposing side plates 104. As discussed above, in some embodiments of the frame assembly, side plates may be fixedly coupled (e.g. welded, adhered, integral, etc.) to the cross bar 15, while in other embodiments, the side plates may be releasably coupled. FIGS. 7 and 8 show a non-limiting example of side plates 104 that are releasably coupled to the cross bar 15. As a specific example, in some embodiments, the cross member 15 may have a mounting plate 110 fixedly attached to each end of the cross member 15. The mounting plate 110 is positioned to lie parallel with the side plate 104, facilitating their coupling. The mounting plates 110 may be releasably coupled to the side plates 104 using bolts, or any other releasable coupling known in the art.

According to various embodiments, the turfgrass brushing assembly may be configurable to adjust the position of the brush 40 (or brush holder assembly 30) relative to the frame assembly. This may be advantageous, allowing a user to adjust the degree with which a brush 40 engages turfgrass, and to compensate for variations in shapes and sizes of mower cutting units 2. As discussed above, in some embodiments, the brush holder assembly 30 may be coupled to the cross member 15 through vertical adjusters 34 that permit adjustment of the height, or position of the brush holder assembly 30 relative to the cross member 15.

Some embodiments of the turfgrass brushing assembly, including the non-limiting example shown in FIGS. 7 and 8, the "height" or position of the cross member 15 relative to the side plates 104 (and therefore, relative to the mower cutting unit 2 or associated framework) may be adjustable. As shown, the side plates 104 each have an array of holes 108. The cross member 15 may be releasably coupled through one or more of these holes 108, on each end 112, using bolts or any other releasable coupling known in the art. Changing the position of the cross member 15 relative to the side plates 104 may be used to adjust the "height" of an attached brush 40, to adjust the degree to which a brush 40 engages the turf, to adapt the turfgrass brushing assembly 100 for use with a particular mower cutting unit 2, or any combination of the foregoing. According to various embodiments, the turfgrass brushing assembly 100 may comprise vertical adjusters 34, side plates 104 having arrays of holes 108 for adjustably mounting the cross member 15, or both. Of course, as stated above, other embodiments may have the position of the brush 40 relative to the frame assembly fixed.

Each of the two opposing side plates 104 may comprise a pivot coupling 106, according to various embodiments. As discussed above, the pivot coupling 106 allows the turfgrass brushing assembly 100 to pivotally and releasably couple to a mower cutting unit 2 (e.g., a receiver in mower cutting unit 2) or it's associated framework. In some embodiments, including the non-limiting example shown in FIGS. 7 and 8, the pivot couplings 106 may comprise bushings 118 that extend outward from a surface of the side plate 104. As discussed above, these couplings 106 may extend from the inward facing surface or outward facing surface of the side plates 104. In other embodiments, other pivot couplings 106 may be used. The pivot coupling 106 may comprise any of the materials, shapes, and configurations of pivot couplings described elsewhere in this document.

As discussed above, in some embodiments, a bumper 68 is coupled to one or both side plates to make contact with the turfgrass mower cutting unit 2 to limit the extent to which the brushing assembly can pivot towards the mower. In other embodiments, the turfgrass brushing assembly 100 may comprise one, two, or more fixed couplings 114 that prevent the brushing assembly 100 from pivoting about the pivot coupling 106. In some embodiments, the fixed couplings 114 may prevent all pivoting, while in others they may just limit the range of pivoting (e.g. the bumper 68, etc.).

As shown in the non-limiting example of FIGS. 7 and 8, in some embodiments, the fixed coupling 114 may be one or more bolts 116 that couple the frame assembly 102 to a portion 120 of the mower cutting unit 2 or its associated framework. Other embodiments may comprise other fixed couplings 114, including but not limited to pins, clips, clamps, and the like. It should be noted that these couplings are "fixed" in that they limit the degree the brushing assembly 100 may pivot about the pivot couplings 106, but are meant to exclude releasable couplings. Some embodiments of the brushing assembly 100 may comprise multiple forms of fixed couplings 114, for use with mower cutting units 2 having different shapes and sizes.

Figure 9:
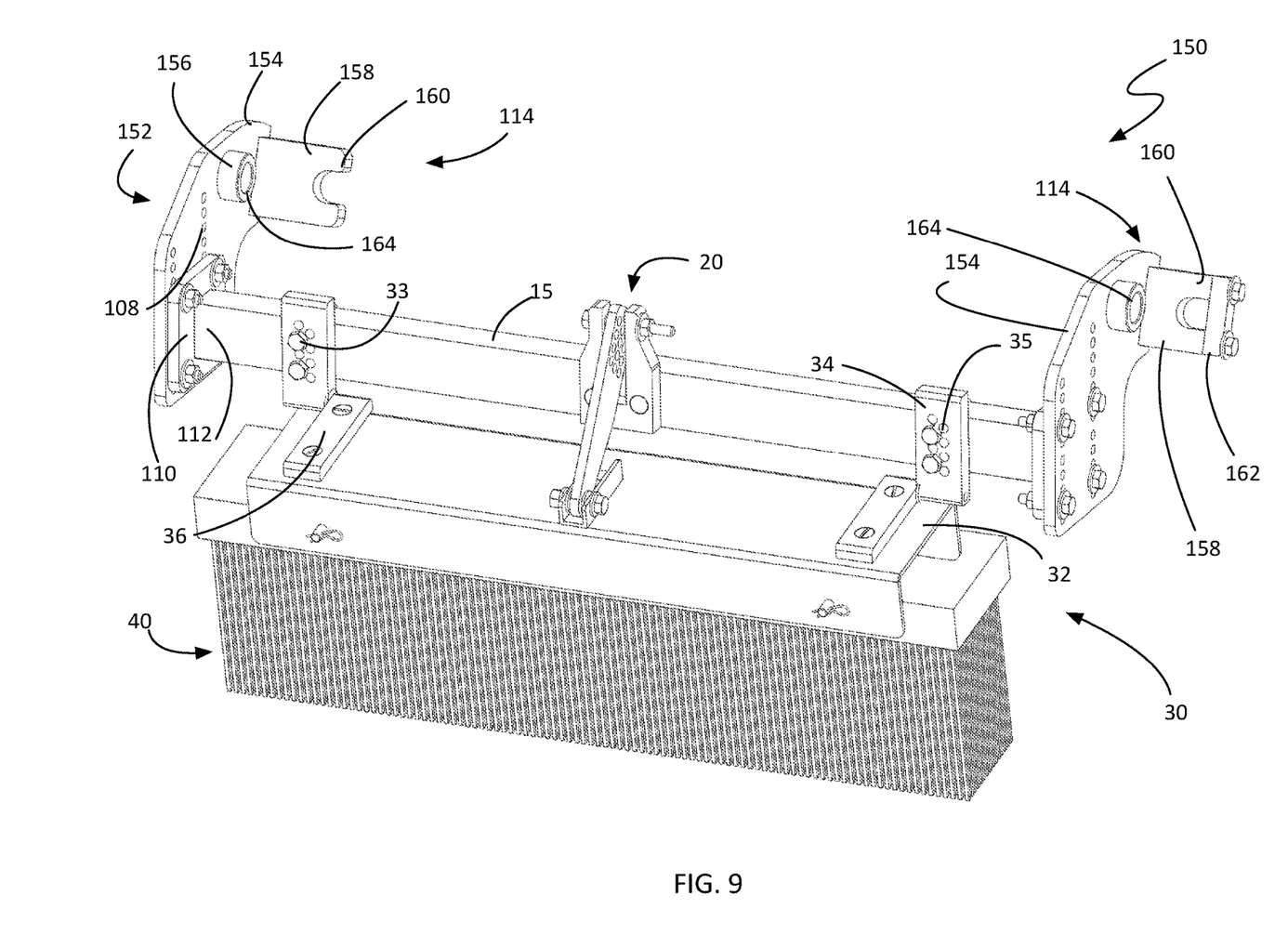
FIG. 9 is a perspective view of a fourth embodiment of a turfgrass brushing assembly.
Figure 10:
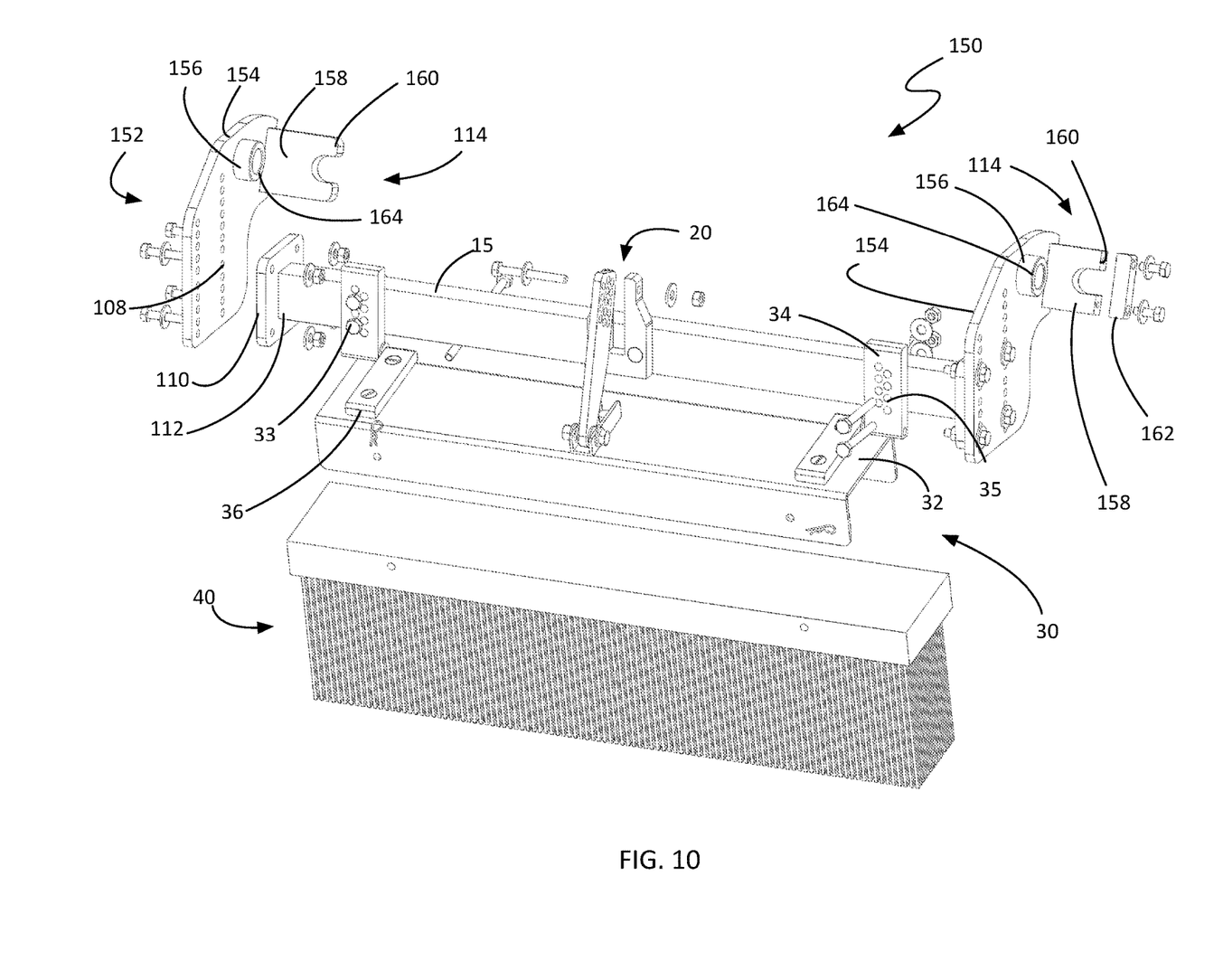
FIG. 10 is an exploded view of a fourth embodiment of a turfgrass brushing assembly.

FIGS. 9 and 10 depict still another non-limiting embodiment of a turfgrass brushing assembly 150. Again, unless otherwise specified, a turfgrass brushing assembly 150 comprises parts, elements, and descriptions provided above in relation to turfgrass brushing assemblies 1, 50, and 100. For example, a turfgrass brushing assembly 150 may comprise a brushing assembly 30, an angle adjustment assembly 120, vertical adjusters 34, and the like similar to those described in relation to the turfgrass brushing assemblies 1, 50, and 100. Furthermore, it is contemplated that aspects of a turfgrass brushing assembly shown in relation to the turfgrass brushing assembly 1, 50, and 100 may be applied to a turfgrass brushing assembly 150, and vice versa, without departing from the scope of this disclosure.

In one or more embodiments, turfgrass brushing assembly 150 is similar to brushing assembly 100, having a frame assembly 152 comprising a cross member 15 and two opposing side plates 154. As shown, each of the two opposing side plates 154 may comprise a pivot coupling 156, according to various embodiments. According to various embodiments, the pivot coupling 156 may be an aperture 164 in the side plate 154. In some embodiments, the aperture 164 may receive a coupling that passes through a portion of the mower unit 2, while in other embodiments, including the non-limiting example shown in FIGS. 9 and 10, the aperture 164 may be sized and positioned to receive a portion 120 of the mower unit 2 or its associated framework.

It should be noted that while FIGS. 7 and 8 show each side plate having a bushing 118, and FIGS. 9 and 10 show each side plate having an aperture 164, in other embodiments, the side plates may each have a different pivot coupling (e.g. one has a bushing, the other has an aperture, etc.). This may be advantageous for particular mower cutting unit 2 geometries.

The non-limiting example of a turfgrass brushing assembly 150 shown in FIGS. 9 and 10 further comprises fixed couplings 114 that prevent the assembly 150 from pivoting about the pivot couplings 156. As shown, the fixed coupling 114 may be a yoke 158 having a concave end 160 sized and shaped to receive a portion 120 of a mower cutting unit 2 or its associated framework. Some embodiments may have a single yoke 158, while others may have two or more yokes 158. As an option, one or more yokes 158 may further comprise a fastener 162 that couples to the concave end 160, closing it and trapping a portion 120 of the mower cutting unit 2 or associated framework inside the concave end 160.

As shown, the yoke(s) 158 extend out from the side plates 154. In some embodiments, each side plate 154 may comprise a yoke 158. In some embodiments, they may extend in opposite directions (e.g. both inward, both outward, etc.). In other embodiments, including the non-limiting example shown in FIGS. 9 and 10, they yokes 158 may extend in the same direction (e.g. one inward and one outward, etc.). Some embodiments may employ similar or identical fixed couplings 114 on each side plate 154, while other embodiments may use different fixed couplings 114 (e.g. one yoke and one bolt, etc.).

Figure 11:
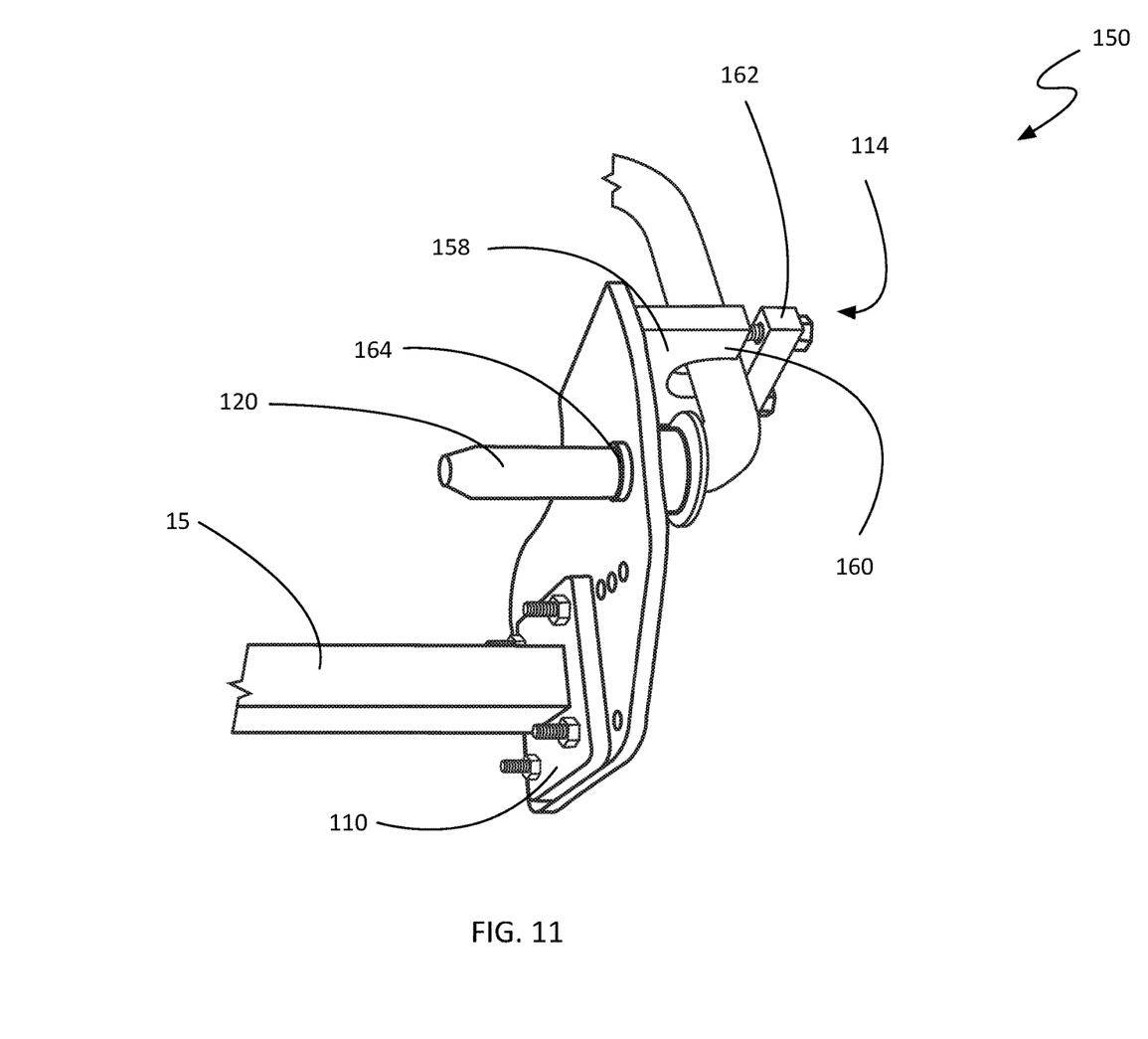
FIG. 11 is a perspective close-up view of a fourth embodiment of a turfgrass brushing assembly coupled to a portion of a turfgrass mower cutting unit.

FIG. 11 is a non-limiting example of a portion of a turfgrass brushing assembly 150 that has been coupled to a portion 120 of a mower cutting unit 2. As shown, the portion 120 has been inserted through the aperture 164 about which, absent any other coupling, the assembly 150 could pivot. However, that pivoting is prevented by the positioning of the portion 120 of the cutting unit 2 (or associated framework) into the concave end 160 of a yoke 158 that serves as a fixed coupling 114. The portion 120 is secured within the yoke 158 by coupling the fastener 162 to the yoke 158.

Also contemplated as part of this disclosure are various methods for brushing turfgrass. According to some aspects, a method of brushing turfgrass comprises pivotally coupling one or more turfgrass brushing assemblies 1 to one or more turfgrass cutting units 2 in front of the one or more turfgrass cutting units 2 with one or more pivot couplings 12 on a frame assembly 10 of each of the one or more turfgrass brushing assemblies 1. A method may further comprise pushing the one or more turfgrass brushing assemblies 1 across turfgrass by pushing the one or more turfgrass cutting units 2 to brush the turfgrass with one or more brushes 40, each of the one or more brushes 40 being coupled to a brush holder assembly 30 adjustably coupled to the frame assembly 10 of a different one of the one or more turfgrass brush assemblies 1.

A method may further comprise vertically adjusting a height of the turfgrass brush 30 of each turfgrass brushing assembly 1 by removing a coupling 33 from one hole 35 of a plurality of holes 35 on a vertical adjuster 34 pivotally coupled to the brush holder assembly 30 and inserting the coupling 33 into a different one of the plurality of holes 35 of the vertical adjuster 34 to couple the vertical adjuster 34 and the brush holder assembly 30 to the frame assembly 10. According to some aspects, a method may further comprise adjusting an angle of the brush holder assembly 30 of the turfgrass brushing assembly 1 by removing a coupling 24 from one hole of a plurality of holes 26 in a linkage arm 25 and a fork 22 coupled to the frame assembly 10, the linkage arm 25 being pivotally coupled to the brush holder assembly 30 distal the plurality of holes 26 in the linkage arm 25, and inserting the coupling 24 through the fork 24 and a different hole of the plurality of holes 26 of the linkage arm 25.

A method may further comprise adjusting a height of the turfgrass brushing assembly 1 by detaching the pivot coupling 12 from one hole of a plurality of holes 16 on a side plate 14 of the frame assembly 10, and reattaching the pivot coupling 12 to a different hole of the plurality of holes 16 on the side plate 14 of the frame assembly 10. According to some aspects, pivotally coupling the one or more turfgrass brushing assemblies 1 to the one or more turfgrass cutting units 2 in front of the one or more turfgrass cutting units 2 with the one or more pivot couplings 12 on the frame assembly 10 of each of the one or more turfgrass brushing assemblies 1 comprises inserting opposing bushings 12 of the one or more turfgrass brushing assemblies into two opposing yokes 3 of the one or more turfgrass cutting units 2.

It will be understood that implementations are not limited to the specific components disclosed herein, as virtually any components consistent with the intended operation of a method and/or system implementation for a turfgrass brushing device may be utilized. Accordingly, for example, although particular turfgrass brushing devices may be disclosed, such components may comprise any shape, size, style, type, model, version, class, grade, measurement, concentration, material, weight, quantity, and/or the like consistent with the intended operation of a method and/or system implementation for a turfgrass brushing device may be used.

In places where the description above refers to particular implementations of turfgrass brushing devices, it should be readily apparent that a number of modifications may be made without departing from the spirit thereof and that these implementations may be applied to other turfgrass brushing devices. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A turfgrass brushing assembly, comprising:
a frame assembly configured to removably couple to a mower cutting unit, the frame assembly comprising a cross member and two opposing side plates, each side plate comprising an array of holes and a pivot coupling configured to pivotally couple the turfgrass brushing assembly to the mower cutting unit, each side plate releasably coupled to a different end of the cross member through at least one hole of the array of holes to allow a user to adjust the position of the cross member with respect to the two opposing side plates;
a brush holder assembly adjustably coupled to the frame assembly, the brush holder assembly comprising a brush block coupling configured to couple to a brush; and
an angle adjustment assembly coupled to the brush holder assembly and the cross member of the frame assembly, wherein the angle adjustment assembly pivots to adjust a relative angle of the brush holder assembly with respect to the frame assembly.

2. The turfgrass brushing assembly of claim 1, wherein each end of the cross member comprises a mounting plate, and wherein the cross member is removably coupled to the two opposing side plates through the mounting plates.

3. The turfgrass brushing assembly of claim 1, wherein the frame assembly further comprises two fixed couplings that couple the frame assembly to the mower cutting unit and prevent the turfgrass brushing assembly from pivoting about the pivot couplings of the frame assembly with respect to the mower cutting unit.

4. The turfgrass brushing assembly of claim 3, wherein the pivot coupling of each side plate is an aperture sized to receive a portion of the mower cutting unit.

5. The turfgrass brushing assembly of claim 4, wherein each of the two fixed couplings of the frame assembly is a yoke having a concave end sized to receive a portion of the mower cutting unit.

6. The turfgrass brushing assembly of claim 5, further comprising a fastener releasably coupled to the concave end of one of the two yokes, closing the concave end and trapping the portion of the mower cutting unit.

7. The turfgrass brushing assembly of claim 1, further comprising a brush removably coupled to the brush block coupling, wherein the brush holder assembly further comprises one or more swivel blocks coupled to the brush block coupling and pivotally coupled to the frame assembly, and wherein the one or more swivel blocks comprise two swivel blocks each pivotally coupled to a different vertical adjuster of two vertical adjusters, each of the two vertical adjusters being removably coupled to the cross member of the frame assembly with a coupling extending through one of a plurality of holes positioned to allow a user to vertically adjust a height of the vertical adjuster and the brush holder assembly by extending the coupling through one of the plurality of holes.

\* \* \* \* \*